United States Patent

[11] 3,592,085

| [72] | Inventor | Floyd D. Arneson<br>2028 "L" St., Springfield, Oreg. 97477 |
|---|---|---|
| [21] | Appl. No. | 772,129 |
| [22] | Filed | Oct. 31, 1968 |
| [45] | Patented | July 13, 1971 |

[54] SAW CHAIN GRINDING DEVICE
5 Claims, 9 Drawing Figs.
[52] U.S. Cl. .................................................. 76/25,
51/36, 51/98.5, 76/42
[51] Int. Cl. ...................................................... B23d 63/00
[50] Field of Search............................................ 76/25 A,
42; 51/98.5, 36

[56] References Cited
UNITED STATES PATENTS
| 1,117,595 | 11/1914 | Oatley | 76/42 |
| 2,067,179 | 1/1937 | Elder | 76/42 X |
| 2,318,456 | 5/1943 | Blum | 76/25 A |
| 2,986,048 | 5/1961 | Nielson | 76/25 A |

Primary Examiner—Bernard Stickney
Attorney—James D. Givnan, Jr.

ABSTRACT: The present disclosure includes a stationary electrical motor with abrasive grinding means affixed to its motor shaft. A saw-chain-holding mechanism is positionably mounted adjacent the grinding means for advancing a chain saw cutter tooth held thereon into sharpening contact with said grinding means. The holding mechanism includes chain-engaging elements to locate and secure each during grinding. The abrasive means includes a shaped grinding wheel for rotation in a single plane and having a beveled surface against which a cutter tooth may be horizontally swung while retained on said mechanism. A screw feed is provided for additionally locating a cutter tooth during grinding. At the completion of grinding the cutter tooth is swung away from the grinding means whereupon another cutter tooth of the same series may be advanced into place on the chain-holding mechanism.

PATENTED JUL 13 1971

INVENTOR.
FLOYD D. ARNESON
BY James D. Givens Jr.
AGENT

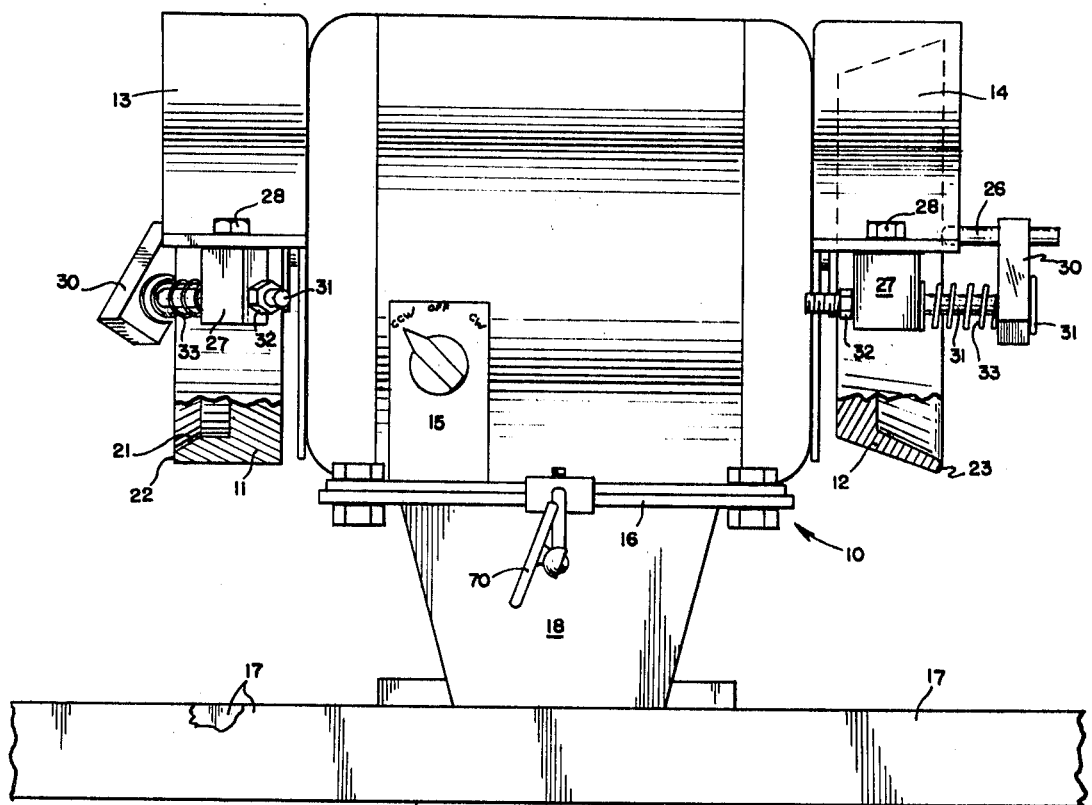
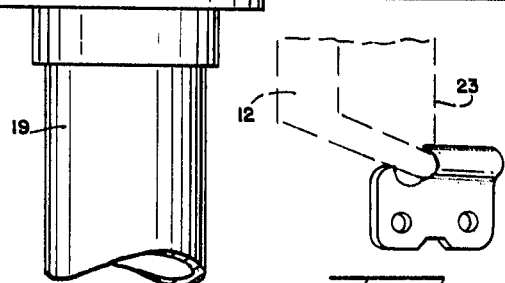
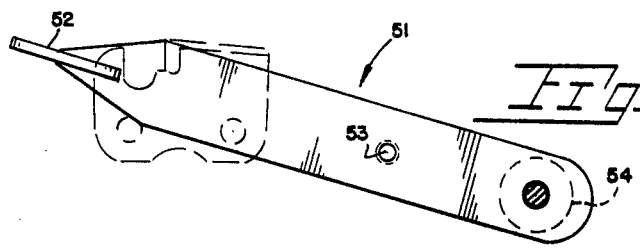
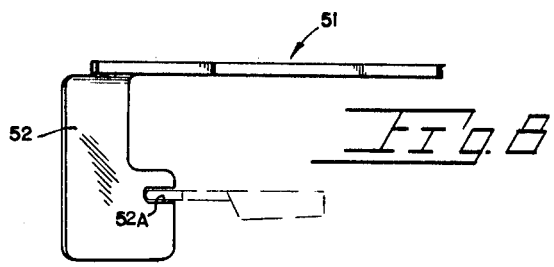

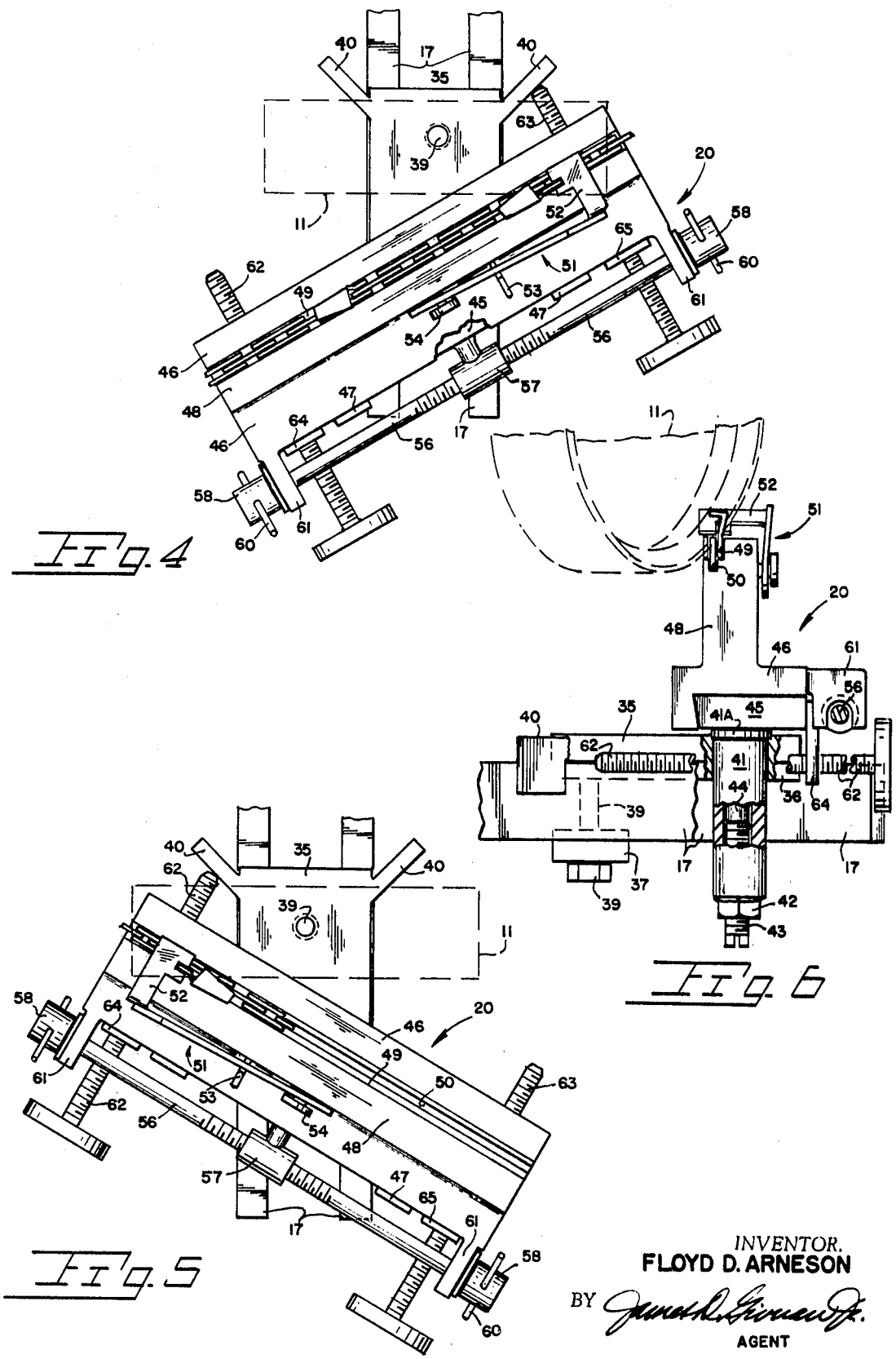

3,592,085

SAW CHAIN GRINDING DEVICE

BACKGROUND OF THE INVENTION

The present invention relates to the grinding devices and more particularly to such a device having positionable means for advancement of a chain saw cutter tooth held thereon into grinding engagement with a fixedly mounted, shaped grinding wheel.

The prior art I am aware of for the most part generally embodies grinding machines of complex structure heretofore necessary to accomplish the sharpening of the complex, angularly related surfaces of a saw chain cutter tooth. Such tooth surfaces for present purposes, conventionally have an upright cutting surface which merges upwardly with a substantially horizontally extending surface. To accomplish simultaneous, uniform sharpening of both surfaces and their forward cutting edges by a motor-driven grinder has, in the past, required complicated arrangements both costly to manufacture and requiring several operational steps for grinding of each tooth.

In contrast, the present device utilizes a motor-driven grinder fixedly mounted in place upon a support and having at least one grinding wheel which is dressed or shaped to a desired configuration and against which each cutter tooth being sharpened is moved in a uniform and precise manner. Wheel-dressing tools are included to insure the desired wheel configuration being retained.

Screw feed means are associated the saw-chain-holding mechanism to precisely advance the initial tooth of each series into contact with the grinding wheel while an additionally provided pivot for the mechanism allows convenient pivotal or swinging movement of all left-hand series or all right-hand series of cutter teeth successively into grinding position.

SUMMARY

The device for grinding chain saw cutter teeth as presently disclosed utilizes grinding means having beveled surfaces for the sharpening of the angularly related surfaces of a chain saw cutter tooth. Also important to the present invention is the provision of means allowing for multidirectional positioning of the tooth during its grinding in relation to the fixedly positioned rotating grinding wheel. Further the last-mentioned means allows both left-hand and right-hand series of cutter teeth to be sharpened by the device requiring only horizontal swinging movement of the chain holder about its upright pivot and reversing of the direction of the saw chain in place thereon for sharpening of the remaining series of teeth. Positioning means for the cutter teeth assure identical locating of each tooth of a series for uniform sharpening.

DESCRIPTION OF THE DRAWINGS

FIG. 2 is a front elevational view of the grinder with dressing tools mounted thereon for shaping contact with grinding wheels, FIG. 4 is an enlarged plan view of the chain-holding mechanism operatively disposed holding a right-hand cutter tooth against a grinding wheel shown in dashed lines, FIG. 5 is a view similar to FIG. 4 with the chain-holding mechanism rotated about an upright axis for grinding the left-hand series of cutter teeth, FIG. 6 is an end elevational view of the chain-holding mechanism of FIG. 4 with fragments broken away to reveal internal structure, FIG. 7 is a side elevational view of tooth-positioning means engageable with the depth gauge of a cutter tooth prior to its grinding, FIG. 8 is a plan view of the tooth-positioning means shown in FIG. 7, and FIG. 9 is an oblique elevational view of a round tooth cutter with a segment of the flared abrasive wheel in broken lines.

DESCRIPTION OF PREFERRED EMBODIMENTS

Figure 1:
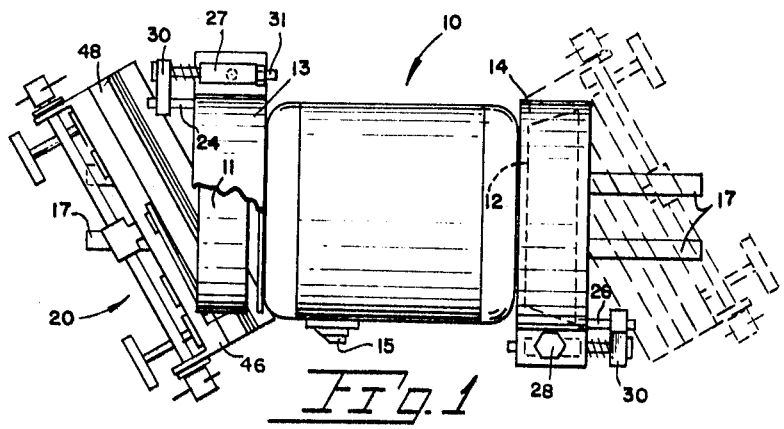
FIG. 1 is a plan view of the present grinding device.

With continuing reference to the drawings wherein like numerals designate like parts the reference numeral 10 indicates generally an electric grinder of the type preferably having an output shaft at both of its ends for reception of a grinding wheel as at 11 and 12. The motor housing supports shields 13—14 in the conventional manner, the shield covering the upper half of the wheels 11 and 12. The electric motor of the grinder is of the reversible type as is standard for double-ended grinders and is provided with suitable switch control 15 for such operation. The mounting platform is indicated at 16 (FIG. 2) which platform is vertically spaced from a pair of rails 17 by means of a pedestal 18 fixedly secured intermediate the rails which are in turn supported by a standard 19.

Positionably mountable along the rails 17 adjacent either of the wheels 11 or 12 is a chain holder mechanism indicated generally at 20 and which may be easily removed for placement on the opposite portion of the pair of rails 17 for grinding of different shaped cutter teeth. An entirely practical embodiment of the invention may include only a single wheel if desired. The grinding wheels are particularly shaped for the sharpening of commonly used styles of cutter teeth as later described. The chain holder mechanism 20 is adapted for pivotal movement of its ends toward and away from opposite segments of the grinding wheel 11 or 12 to swing the tooth being sharpened about an upright axis. Further means are included within the mechanism 20 for raising or lowering the tooth mounted thereon in relation to the fixedly mounted grinding wheel all being particularly described hereinafter. The chain-holding mechanism in combination with the two shaped grinding wheels 11 and 12, both having inclined grinding surfaces, enables two different types of chain saw cutter teeth to be sharpened on one grinding device.

The grinding device as shown and described mounts commercially available abrasive or grinding wheels with wheel 11 of cup shape with an outer circumferential wall, an annular beveled rim portion 21 and a rim portion 22 normal to the wheel's axis for the grinding of a cutting edge on a chisel-bit-type cutter tooth. Such a cutter tooth is characterized by right angularly related vertical and horizontal parts intersecting along a sharply defined edge. A cutter tooth has generally a horizontally disposed cutting surface extending across the horizontal part of the tooth which surface is contiguous with a generally vertically disposed cutting surface. For accurate grinding of these surfaces in one operation, the beveled grinding surface 21 with a grinding surface 22 is utilized. With continuing reference to FIG. 2 the wheel 12 on the other motor output shaft is generally termed of flare shape and utilized for the grinding of that type of cutter tooth known in the art as a round tooth cutter. Round tooth cutters are characterized by a continuous horizontal and vertically curved cutting edge which may be sharpened by an abrasive tool having a rounded rim for sharpening. Such a rim surface is indicated at 23. The flare shape of wheel 12 provides a reduced sectional area of wheel 12 which projects intermediate the tooth's depth gauge and cutter as shown in FIG. 9. The chain holder mechanism 20, described in detail as follows, provides for the angular presentation (FIGS. 4 or 5) of either chisel-bit or round-tooth-type cutters respectively to the grinding surfaces of wheels 11 and 12 in a convenient, uniform and rapid manner. The grinding device herein described is accordingly capable of grinding different types of cutter tooths with the motor and its wheels being in a fixed position with all of the relative movement toward and away from the grinding surfaces being provided for by the chain holder mechanism 20.

Figure 3:
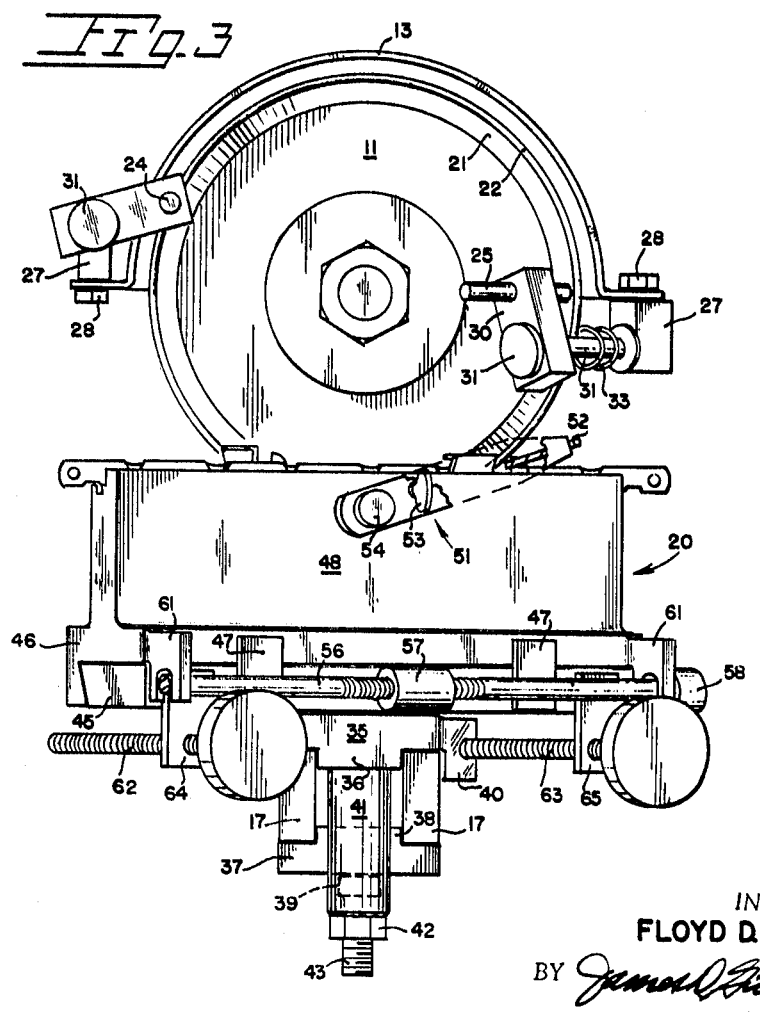
FIG. 3 is a side elevational view of the left-hand end of FIG. 1.

As shown in FIGS. 1—3 a pair of diamond tip wheel dresses at 24 and 25 are adjustably mounted on the guard 13 to dress the surfaces 22 and 21, the opposite or flared grinding wheel 12 requires but one diamond tip dresser at 26 (FIG. 1) to maintain the curved grinding surface 23. Each diamond tip wheel dresser is mounted for movement in a horizontal plane into wheel contact as follows. Typically each block 27 is pivoted about and locked in place by means a capscrew 28 extending through an out-turned end of the shield 13. Each wheel dresser 24—26 is secured in an arm 30 for movement with the arm in an upright plane about the axis of a bolt 31 which is threaded at one of its ends for adjustable engagement with block 27 and thereat receives a nut element 32. A spring 33 biases the arm 30 against the bolthead to fixedly retain the dresser in position once the same has been disposed in desired contact with the surface to be ground by adjustment of the aforementioned elements 27 through 32. Only periodic dressing of the wheels is required after which of course the dressing tools may be swung out of contact with the wheel surfaces being dressed.

With attention to FIGS. 3 through 6 the chain-holding mechanism 20 will now be described as best shown in particular in FIG. 3. The mechanism is adjustably mounted as aforesaid on the arms or rails 17 in a manner for slidable movement toward or away from the grinding wheels 11—12. In clamping relationship to the upper and lower surfaces of the rails 17 is a main plate member 35 having a central portion 36 extending downwardly a slight distance intermediate the rail 17. For clamping contact against the underside of the rails, I provide a block 37 having a like central portion 38 which receives a bolt 39 (FIG. 6) extending through a bore within said block for upward threaded engagement with the main plate member 35 permitting the clamping of said plate member and block in fixed position onto the rails at desired point therealong. The main plate member 35 has a pair of angularly disposed ears 40 integral therewith which are engaged by adjustable, threaded shafts or stops as later described. Plate number 35 and its integral central portion 36 as shown in FIG. 6 are bored to receive in a friction fit a bored bearing sleeve 41 which extends downwardly past the rails 17 and is fitted with a threaded stationary nut 42 which adjustably receives a screw stud 43. The upper terminus of the stud adjustably supports a stub shaft 44 extending upwardly past the upper portion of sleeve 41 for securement within a bed 45 of the chain holder mechanism. A suitable thrust washer 41A provides for clearance of the bed 45 over the main plate member 35 allowing horizontal swinging movement of the bed about the upright axis of shaft 44.

Slidably mounted upon bed 45 in an horizontal lengthwise direction is a chain-holding slide block 46 which as viewed in FIG. 6 is in dovetailed engagement along one of its sides with the bed while being held against lateral displacement along its opposite side, as best shown in FIG. 4, by downwardly projecting pairs of plates 47 which are in sliding contact with the front wall of the bed. Extending the length of the chain-holding slide block 46 is a perpendicular extension 48 which is formed to receive and secure a segment of the links of a chain saw preparatory to advancement of a cutter tooth thereon into sharpening contact with one of the grinding wheels. Such advancement occurs in one direction about the axis of shaft 44 while additional tooth advancement is accomplished by lengthwise movement of the block 46 along the bed 45. The block 46 is machined lengthwise along its upper extremity to provide an inset portion 49 therealong to receive the links of a segment of the chain saw being sharpened. A channel 50 is machined within said inset portion to receive downward projections of the guide links of the chain segment, said guide links normally being middle links.

Necessary to the accurate grinding of each cutter tooth to a uniform extent is the provision of a tooth positioner indicated generally at 51 and being best shown in FIGS. 7 and 8. The tooth positioner includes an arm swingably mounted to the perpendicular extension 48 for engagement with both right-hand and left-hand series cutter teeth to secure same downwardly while also binding the same laterally toward or against the inset 49 of said extension. The tooth positioner 51 is provided with a laterally directed plate portion 52 which is of a height and inclination to ride over the chain saw link elements during repositioning of the successive cutter teeth into position for cutting. As shown in FIG. 7 the tooth positioner 51 will ride upwardly and over the chain links as the chain segment is pulled toward the right-hand direction. A groove is formed at 52A (FIG. 8) in the inclined portion to receive the upper part of tooth's depth gauge thus locating the tooth and all subsequently to be ground cutter teeth in the same location on the chain-holding block 46 preparatory to grinding thereof. For moving the cutter tooth transversely into binding engagement with the inset portion 49, a thumbscrew 53 extends horizontally through the positioner 51 into bearing contact with the extension 48 whereupon rotation of the thumbscrew urges the limit stop outwardly away from the extension causing the inclined portion 52 of the limit stop to urge the cutter tooth by means of its depth gauge being held thereby laterally into firm engagement against the extension 48. Since all of the left-hand series or all of the right-hand series of cutter teeth will be ground in succession that is, in effect skipping every other cutter tooth of the chain saw, the tooth positioner 51 need not be repositioned after the grinding of a cutter tooth but simply eased off from biased contact with the tooth by rotation of the thumbscrew 53 which will then allow the positioner 51 to ride upwardly over the links intermediate one cutter tooth and the next cutter tooth of that series to be ground. Upon locationing of the depth gauge of that cutter tooth in seated engagement in the groove 52A the tooth positioner is again tightened down by means of the thumbscrew to further secure or bind the cutter tooth in place on the extension as aforesaid. Upon completion of the grinding of all of one set of cutting teeth in a saw chain the chain is removed, reversed in direction and remounted in place on the extension as shown in FIG. 5 (reversed from its direction in FIG. 4) and the positioner 51 is then simply swung toward the opposite end of the extension 48 for engagement with the depth gauge of each of the remaining set of cutter teeth to be ground. Tooth positioner 51 is pivotally attached at 54 to the extension 48.

A screw feed for the chain-holding mechanism 20 is provided in the form of a centrally threaded shaft 56 which is threadedly engaged along its center portion with an internally threaded member 57 said member being secured to the bed 45. The ends of shaft 56 are fitted with enlarged end members 58 which receive finger grips 60. Projections at 61 are integral with the chain holder casting 46 and extend outwardly therefrom to loosely receive the opposite end portions of the shaft 56 as typically shown in FIG. 6 whereby it will be seen that rotation of shaft 56 will advance one of its end members 58 toward member 57 thus slide block 46 will be advanced lengthwise along the bed 45. A screw feed is accordingly provided for precisely advancing a cutter tooth securely held in place into grinding contact with the surfaces of the grinding wheel. Once this adjustment has been made all subsequently ground teeth upon being located in place on extension 48 by the positioner 51 will be brought into grinding contact in a uniform manner without further adjustment of the screw feed being necessary. Damaged cutter teeth may be individually adjusted into engagement with the grinding wheel to accomplish sharpening whereupon the screw feed may return the block 46 to again locate subsequently ground teeth of like size in a uniform manner. Obviously it is important to grind each cutter tooth in an identical manner when possible. To this end once the screw feed sets chain-holding block 46 in the desired location upon the bed 45 further adjustment during the grinding of one set of cutters will usually not be necessary if the chain saw is in good condition.

Adjustable stops are provided for limiting the horizontal swinging movement of the chain holder mechanism 20 which movement is generally at a right angle to the positioning accomplished with the above-described screw feed means. The stops comprise a pair of threaded shafts 62 and 63 each of which extends in a threaded manner through plates 64—65, said plates depending from near the opposite ends of the bed 45. As best seen in FIGS. 4 and 5 the opposite ends of chain-holding mechanism 20 are accordingly swingable about the upright axis of shaft 44 inwardly toward the grinding wheel to the extent determined by the positioning of the threaded shaft 62 and 63. Once the end of threaded shaft 62 or 63 has been axially positioned to contact ears 40 to limit the horizontal swinging movement of the chain holder mechanism toward the grinding wheel into the positions shown in FIGS. 4 and 5 such will only be varied during the grinding of a damaged or severely worn tooth. The tooth being sharpened is advanced into wheel contact on an arc the center of which is the upright axis of shaft 44.

Adjustment or positioning of the cutter tooth is along two separate, right angularly disposed directions toward the grinding wheel. Once the first tooth of a series is positioned all subsequent movement of that tooth and the rest of the teeth in that series need only be in a swinging manner about the upright axis of shaft 44. The threaded shafts or stops 62 and 63 will be positioned as to stop such inward movement of the chain holder mechanism 20 to the extent shown in FIGS. 4 and 5, the limit of such movement being determined by contact of the end of one of the threaded shafts 62—63 with one of the ears 40. Again as is common with these first-described screw feeds an adjustment need only be made for the first cutter tooth of a right-hand or left-hand series and thereafter all teeth in that series will be ground to an identical condition upon being presented in a horizontally swung manner to the grinding wheel. The sharpening occurs as the tooth is gradually "wiped" into full grinding contact with the abrasive wheel with the operator exerting a slight amount of force on the mechanism 20.

In operation the chain holder mechanism 20 is mounted on the rails 17 outwardly disposed from the particular grinding wheel 11 or 12 dependent upon the type or make of saw chain being sharpened. Adjustment of stud 43 may be necessary to raise or lower the bed 45 and hence chain holder slide block 46 mounted thereon to a height which will provide desired grinding contact of tooth and wheel at a proper point upwardly on the wheel circumference. For instance, the sharpening of the round tooth cutter which is conventionally smaller than a chisel bit cutter would require raising of the slide block 46 to present the round tooth cutter to the wheel at the desired point thereon. The vertical adjustment will determine at what point along the arc of the wheel contact will take place. Assuming such has been accomplished the next step in setting up the chain saw mechanism 20 is the securing in place of said mechanism on the arms 17 by tightening of the clamping means previously described which includes the bolt member 39. The screw feed is then utilized to locate the initial cutter tooth of the first series being sharpened for subsequent gradual movement in a horizontal swinging manner into the grinding wheel. At the extent of this inward movement the cutter will have been ground a desired amount. Thereafter the chain holder mechanism is horizontally rotated oppositely about the axis of shaft 44 to a position parallel with the grinding whereupon loosening of thumbscrew 53 will permit the tooth positioner 51 to loosely ride over the chain saw links intermediate the tooth just sharpened and the next tooth to be ground. Locating of the next tooth in place with its depth gauge within the groove 52A in the inclined portion thumbscrew is again tightened down thereby urging the cutter laterally toward the perpendicular portion 48 of the block 46 with the tooth now so held. The chain holder mechanism 20 is simply again rotated toward the grinding wheel to present said cutter tooth into wiping contact with grinding wheel. The cutter tooth is advanced slowly during the cutting action to the full extent allowed by the threaded shafts 62 or 63 and sharpening is completed at the limit of such travel.

For added convenience to the operator, I have found that the use of small adjustable mirrors as typically shown at 70 in FIG. 2 to permit viewing of the side of the cutter tooth being ground which side is opposite or hidden from the operator during grinding.

What I claim under my U.S. Letters Patent is:

1. A grinding device for sharpening saw chains of the type having cutter teeth links with oppositely directed cutter portions alternately spaced along the chain and interconnected by spacer links for travel about the stationary cutter bar of a chain saw, said device comprising in combination,
   a grinder unit including an electric motor horizontally fixed in place on a support, said motor having at least one grinding wheel carried by the motor output shaft with said wheel having a tooth-grinding surface in inclined relationship to the horizontal axis of said motor shaft,
   rail means carried by the support and extending horizontally outward past said grinding wheel,
   a chain-holding mechanism positionable and lockable along said rail means in spaced relationship from grinding wheel, said chain-holding mechanism comprising,
      a plate member adjustable and lockable along said rail means,
      upright pivot means carried by said plate member and having a vertical axis normal to a projected axis of the motor shaft,
      an elongate bed pivotally supported at its center by said pivot means permitting horizontal movement of the bed about said vertical axis,
      an elongate slide block mounted on said bed and recessed along its uppermost edge to receive a segment of saw chain therealong, both said slide block and its supporting bed swingable in either direction about said vertical axis into tooth-grinding positions whereat one end of the slide block is in oblique underlying relationship to a quadrant of the abrasive wheel to cause oblique passage of the wheel edge through the cutter tooth being sharpened intermediate the tooths depth gauge and its rearwardly spaced cutting surface,
      a tooth positioner for locationing the tooth being sharpened within the recessed upper edge of the slide block adjacent one end of the slide block, and
      threaded means coacting between the bed and said slide block for positioning and retaining the latter in adjusted relationship to the bed for the purpose of locating the tooth being sharpened a desired distance from the upright axis for arcuate swinging movement of the tooth into grinding contact with the wheel edge.

2. The grinding device as claimed in claim 1 wherein said bed includes adjustable means carried at the ends of the bed and each contactable with said plate member to limit inward swinging movement of the corresponding ends of its bed and slide block thereon toward the grinding wheel to in turn limit like movement of a cutter tooth in place adjacent the end of the slide block.

3. The grinding device as claimed in claim 2 wherein said tooth positioner additionally includes means for horizontally biasing the tooth being sharpened into locked engagement against the upper recessed edge of the slide block.

4. The grinding device as claimed in claim 3 wherein said tooth positioner defines a groove at one of its ends engageable with the depth gauge of the tooth being sharpened.

5. The grinding device as claimed in claim 1 wherein said grinder unit additionally includes a grinder wheel shield extending arcuately about the abrasive wheel, a pair of wheel-dressing tools adjustably carried by said wheel shield and adapted for simultaneous dressing contact with contiguous grinding surfaces of the wheel.